United States Patent [19]

Pascher

[11] Patent Number: 4,490,422
[45] Date of Patent: Dec. 25, 1984

[54] CLOSURE SYSTEM FOR A SPLIT SLEEVE CONSISTING OF SHRINKABLE MATERIAL

[75] Inventor: Helmut Pascher, Munich, Fed. Rep. of Germany

[73] Assignee: Siemens Aktiengesellschaft, Berlin & Munich, Fed. Rep. of Germany

[21] Appl. No.: 454,711

[22] Filed: Dec. 30, 1982

[30] Foreign Application Priority Data

Jan. 15, 1982 [DE] Fed. Rep. of Germany ....... 3201108

[51] Int. Cl.³ .............................................. F16L 9/00
[52] U.S. Cl. ...................................... 428/36; 138/156; 138/166; 138/167; 138/168; 174/92; 174/DIG. 8
[58] Field of Search .................. 428/36; 138/156, 166, 138/167, 168; 174/92, DIG. 8

[56] References Cited

U.S. PATENT DOCUMENTS

| 2,784,129 | 3/1957 | Stephens | 138/166 |
|---|---|---|---|
| 3,208,478 | 9/1965 | Baines | 138/166 |
| 3,350,751 | 11/1967 | Groschke | 138/166 |
| 3,357,457 | 12/1967 | Myer | 138/166 |
| 3,379,218 | 4/1968 | Conde | 174/DIG. 8 |
| 3,530,898 | 9/1970 | Wilson | 138/167 |
| 3,574,313 | 4/1971 | Tanaka | 174/DIG. 8 |
| 4,268,559 | 5/1981 | Smuckler | 138/166 |
| 4,371,578 | 2/1983 | Thompson | 428/36 |

FOREIGN PATENT DOCUMENTS 3048051 7/1982 Fed. Rep. of Germany .
1503328 3/1978 United Kingdom .

Primary Examiner—John E. Kittle
Assistant Examiner—James J. Seidleck
Attorney, Agent, or Firm—Hill, Van Santen, Steadman & Simpson

[57] ABSTRACT

A longitudinally extending split sleeve of shrinkable material having a pair of reinforced, longitudinally extending edge zones and a closure system of closure elements for closing the edge zone characterized by one of the edge zones having a meandrous profile with cutouts and tabs and the other edge zone having cutouts for receiving the tabs. In one embodiment, the cutouts of the other edge zone are apertures. In another embodiment the other edge zone has a meandrous profile with both tabs and cutouts.

13 Claims, 7 Drawing Figures

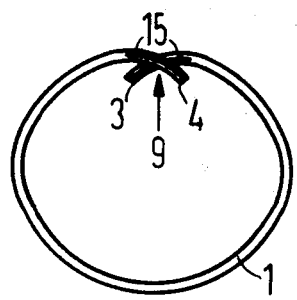
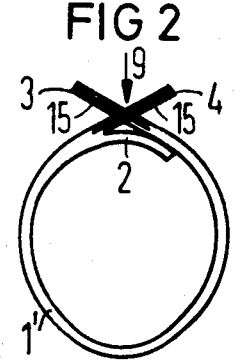
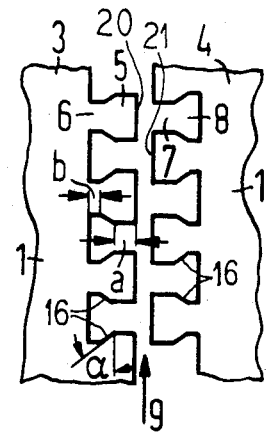
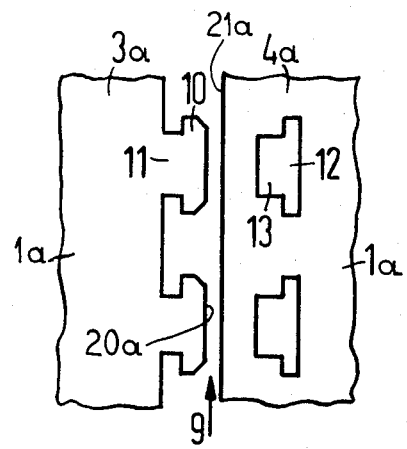
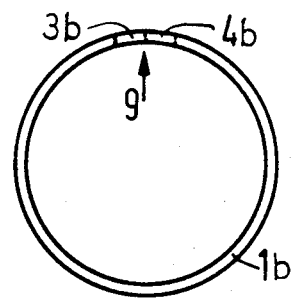
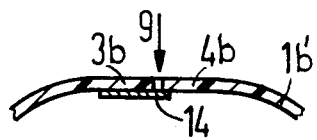
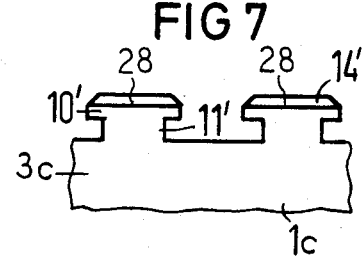

CLOSURE SYSTEM FOR A SPLIT SLEEVE CONSISTING OF SHRINKABLE MATERIAL

BACKGROUND OF THE INVENTION

The present invention is directed to a longitudinally split collar or sleeve consisting of shrinkable material having reinforced edge zones with a closure system extending along each edge zone wherein the closure system consists of mutually interlocking closure elements which are disposed in the area of the reinforced edge zones.

A longitudinally split cable sleeve or collar consisting of a thermoplastic synthetic material which has a shape memory and is provided by a closure system disclosed in copending U.S. patent application Ser. No. 313,342, filed Oct. 20, 1981, which U.S. application issued as U.S. Pat. No. 4,442,153, on Apr. 10, 1984 and was based on German patent application P 30 48 051.4. In the device of the above mentioned patent application, reinforcements are introduced into the edge zones of each of the cable sleeves and the side zones of the cable sleeve are supported by the reinforcements during the shrinkage operation. The closure elements in the form of hook and latch elements are disposed in the area of this reinforcement so that the shrinkage forces which occur during the shrinkage operation can be uniformly transmitted thereto. As a result, irregularities of the softening material during the shrinking operation are avoided. This closure system, however requires closure elements which are either attached as individual parts or which already have been formed into the reinforcements. When utilizing additional closure elements which are attached, this additional step of assembling the closure elements onto the edge zones of the cable sleeve increases the assembly cost. In the second type wherein the closure elements are previously formed in a specially designed reinforcing element, the handling of the cable sleeve can be impaired.

SUMMARY OF THE INVENTION

The present invention is directed to creating a closure system for a longitudinally split sleeve or collar consisting of shrinkable material having embedded reinforcements along the edge zones which closure system can be produced in a simple manner and so that the closure of the sleeve can be effected without further assembly outlay.

To achieve this aim, the present invention is directed to an improvement in a split sleeve consisting of a shrinkable material having first and second longitudinally extending edge zones with edges, closure means for forming a closure system with a parting line between the edges of said zones, said closure means consisting of mutually engaging closure elements being disposed along the parting line in the area of each edge zone and including means for reinforcing the edge zones. The improvements are that the first edge zone has cutout portions extending inward from the edge of the first edge zone to create a meandrous profile with outwardly extending longitudinally spaced projections to form the elements for the first edge zone, each of the cutout portions has a narrow portion at the edge of the first edge zone and a wide portion spaced inwardly therefrom so that each of the projections has a wide portion connected by a narrower neck portion to the rest of the sleeve. The second edge zone has closure element formed by a plurality of cutouts spaced longitudinally therealong with each of the cutouts having a wide zone spaced inwardly from the edge and extending into a narrow zone between the edge and the wide zone, said cutouts of the second edge zone being aligned with projections of the first edge zone and being dimensioned with the width of the wide portion and the wide zone being the same and the width of the neck portion and the narrow zone being the same so that the narrow zone receives the neck portion of the projection when the closure means closes the split sleeve. In one embodiment, the cutouts of the second zone are apertures which are spaced inward from the edge and receive the projections of the first zone. In another embodiment, the cutouts of the second edge zone extend to the edge to form a meandrous profile that is the same as the profile of the first edge zone producing spaced projections and the projections of both edge zones are received in the cutouts of the other edge zone during assembly of the closure system.

Significant advantages of both embodiments over the previously known cable sleeves is that the closure elements are integrated as components of the edge zones of the longitudinally split sleeve. Thus, no additional means for the closure are required. This means simple fabrication and significantly simpler manipulation because the closure occurs merely by means of interlocking the two longitudinally proceeding edge zones of the sleeve.

In all embodiments of the invention, the cutout of the second edge zone may be dimensioned to totally receive the projection of the first edge zone and if desired additional reinforcements may be provided on a surface of one of the two edge zones to prevent accidental disengagement. It is also possible that the dimensions of the cutouts and projections are arranged so that the projection will not be totally received in the cutout of the other edge zone and therefore there will be a projection of the edges which will either be projecting inwardly or outwardly depending on the assembly procedure.

BRIEF DESCRIPTION OF THE DRAWINGS

FIG. 1 is an end view of a longitudinally split sleeve or collar according to the present invention having its interlocked edge zones directed toward the inside;

FIG. 2 is an end view of a modification of a longitudinally split sleeve similar to the sleeve of FIG. 1 with the interlocking edge zones directed toward the outside;

FIG. 3 is a partial plan view illustrating the edge zones of a longitudinally split sleeve of FIG. 1 with the edge zones being disposed adjacent each other;

FIG. 4 is a partial plan view of an embodiment of a longitudinally split cable sleeve with the edge zones being positioned adjacent each other and out of engagement;

FIG. 5 is an end view of another embodiment of a longitudinally split sleeve with the interlocking edge zones forming a continuation of the cylindrical surface;

FIG. 6 is a partial cross-sectional view of a modification of the embodiment of FIG. 5; and FIG. 7 is another enlarged partial plan view of an edge zone of a split sleeve according to FIG. 5.

DESCRIPTION OF THE PREFERRED EMBODIMENTS

The principles of the present invention are particularly useful in a longitudinally split cable sleeve or collar 1 which is illustrated in FIG. 1. The sleeve 1 has a first edge zone 3 and a second edge zone 4 which have closure elements which are engaged and as illustrated are pointing toward the inside of the sleeve 1. During a shrinking operation, a matching of the edge zones 3 and 4 to the wall of the sleeve 1 will occur as a result of the material softening and of the shrinking forces which will occur in a circumferential direction so that a good transition will be created. Since a coating of a melting adhesive is disposed on the inside of the sleeve or collar 1, a seal in the closure area also will occur during the shrinking operation since the softened melting adhesive is correspondingly distributed as a result of the shrinkage of the sleeve 1. It can be further seen that the edge zones 3 and 4 lying opposite one another along a parting line 9 of the collar 1 exhibit reinforcements 15 consisting of heat-resistant material, for example, a metal foil or strip which was introduced into the material of the sleeve 1 during extrusion of the sleeve. The reinforcements 15 effect a stabilization of the softening of the edge zones 3 and 4 during the shrinking process.

The edge contour of each of the edge zones 3 and 4 can be produced by a stamping or cutting process so that the edges can be snapped into one another during assembly. This meshing engagement, however, is not an interlock so that the closing operation can be easily undone before shrinkage as needed. The advantage of this execution lies therein that no closure elements are visible toward the outside. The outside will then exhibit a nearly smooth surface so that nothing can be caught thereon and moreover the injury hazard will be reduced. In addition, there is no danger that the edge zones 3 and 4 will be burned or fused during the shrinking operation. If desirable, an inside flap or an extension similar to an extension 2 illustrated by the sleeve 1' of FIG. 2 can be provided to extend across the parting line 9.

In FIG. 2, a collar or sleeve 1, which has edge zones 3 and 4 that are the same as the edge zones of sleeve 1, is illustrated. However, the edge zones 3 and 4 in the sleeve 1' are interconnected with the edge zones projecting outwardly. These edge zones 3 and 4 are also provided with a corresponding reinforcement 15 so that the necessary stability is maintained in the edge zones 3 and 4 during the shrinking operation. The sleeve 1 also has an inside flap or extension 2 which covers the parting line 9 of the sleeve 1 on the interior of the sleeve. The flap 2 serves to improve the sealing condition in the closure area and is formed as a projection at one of the edge zones. In the sleeve 1', a mutual adaptation of the projecting edges of the edge zones 3 and 4 to the wall of the sleeve 1 will occur due to the shrinkage forces which are directed in a circumferential direction. Further details of the closure are now described in greater detail on the basis of the following Figures.

Both the edge zones 3 and 4 of the sleeves 1 and 1' have a meandrous profile which is best illustrated in FIG. 3. The design of the meandrous profile of the edge zones 3 and 4 is formed by each of the edge zones 3 and 4 having a plurality of inwardly extending cutouts 7 which extend in from an edge such as the edge 20 of the edge zone 3 and the edge 21 of the edge zone 4. The cutout 7 after extending inwardly has a tapering portion that expands into an enlarged zone 8. The enlarged zone 8 will undercut adjacent portions so that the projections or tabs formed between adjacent cutouts will have a neck portion 6 extending into a wide portion 5 which will be adjacent the edge of the zones 3 or 4. The wide portion 5 or broad end tapers down into the narrow space 6 or neck portion with tapering edges 16. The width of the broad portion 5 corresponds to the width of the large zone 8 of the cutout and as noted the cutouts 7 and 8 of the edge zone 4 are opposite projections or tabs 5 and 6 of the edge zone 3.

When interconnecting the two edge zones 3 and 4, they will extend approximately 90° to each other with the large zone 8 receiving a portion of the neck portion 6 of the projections of the opposite edge zone. Due to the dimensions of the cutouts and the projections and also to the thickness of the material forming the sleeve 1, the two edge portions are then pushed or pressed together toward the configuration illustrated in either FIGS. 1 or 2 depending on how the edge zones have been assembled. The mutual meshing of the two edge zones 3 and 4 will occur due to the tapering edges such as 16 of the cutout portions between the cutout zones 7 and 8. In order to prevent the joined edge zones from folding or passing through each other, a length a which is taken in a direction at right angles to the edges 20 and 21 of the wide portion 5 is greater than the length b of the neck 6 and also the enlarged zone 8 of the opposite cutout. Thus, when the two edge zones are drawn apart, a portion of each of the projections or tabs will extend either outside of or inside of the sleeve as illustrated in FIGS. 2 and 1, respectively. In order for the reinforcing elements 15 of the two edge zones 3 and 4 to support themselves against one another in a good manner, it is desirable to corrugate these reinforcing elements with the direction of corrugation extending at right angles relative to the parting line 9 and the edges 20 and 21. It is also desirable that the taper formed by the edges 16 is executed at a relatively steep angle. With relation to the parting line or either of the edges 20 and 21, the tapering edge 16 forms an angle $\alpha$ which is preferably less than 45° to achieve sufficient security to prevent the projections from passing therethrough. The shrinkage forces are effective in a circumferential direction and promote an interlocking process because of further spread of the closure areas is caused as a result of the sleeve 1 pressing against the cable which is being sheathed. The adaptation of the closure area of the collar 1 to the cable can be improved when the junction or transition between the wide zone 8 and the wide zone 7 of the projection are designed and matched to one another in such a manner that a certain interconnection of the narrow zone 7 and the neck 6 of the projections is produced in the transition zone. In other words, the edges 16 engage each other. By so doing, the closure area is drawn very flat so that the projection of the interlocked tabs is very slight.

The necessary seal of the longitudinally proceeding parting line 9 is achieved with the assistance of an inside flap 2 as illustrated by the sleeve 1' in FIG. 2 and/or by coating the sleeve 1 or 1' with the melting adhesive. As illustrated in FIG. 3, the meandrous profile or meander-shaped execution of the profiling of the edge zones 3 and 4 will enable a latching of the two edge zones 3 and 4 together.

An embodiment of the closure system according to the present invention is illustrated in FIG. 4 wherein a sleeve 1a has an edge zone 3a and 4a. As illustrated, the edge zone 3a of the sleeve 1a has a meandrous profile, however, the edge zone 4a has a row of perforations or apertures having a T-shaped configuration with a large or wide zone 12 and a narrow zone 13. The T-shaped apertures extend with the large or wide zone 12 extending substantially parallel to an edge 21a of the edge zone 4a. The narrow zones 13 extend from the wide zones 12 in a direction at right angles to the edges 21a and are positioned between the large zone 12 and the edge 21a. As noted, these narrow portions 13 do not extend up to the edge 21a but terminate inwardly therefrom. If the dimensions of the narrow zone 13 in a direction at right angles to the edge 21a are selected to be only slightly greater than the thickness of the sleeve 1a, then a good protection against unintentional release of the interconnected edge zones 3a and 4a will occur. The meandrous profile of the first edge zone 3a produces a projection having a wide portion 10 connected by a neck portion 11 to the remainder of the sleeve 1a. These projections or tabs formed by the portions 10 and 11 have a "hammerhead" configuration with the width of the large portion 10 corresponding to the width of the wide zone 12 and the width of the neck 11 corresponding to the width of the narrow zone 13. The difference between the embodiments of FIGS. 3 and 4 essentially lie in the fact that the cutouts 13 and 12 in the second edge zone 4a do not extend up to the edge 21a. This arrangement provides a greater protection against an already intermeshed closure being unintentionally drawn through or out of engagement during the shrinking operation. The mutual support of the profiled edges which occur when a meandrous profile is provided is further enhanced when the projections or tabs are designed as a so-called "hammerhead" since they lock into the constricting sections of the narrow zones 13 of the oppositely positioned apertures. An inside flap such as the flap 2 of FIG. 2 can be provided to underlie the parting line 9 of the closure system. In addition, the seal can be undertaken with inserts or coatings consisting of an adhesive which melts during the shrinking operation and is distributed as the result of the shrinking pressure of the sleeve 1. Given the mutual interlocking of the edge zones 3a and 4a, the principle of a "quasicross-wise inter-penetration" according to the arrangement of FIG. 1 or of FIG. 2 can again be applied whereby basically no significant difference will occur in comparison to the above mentioned embodiment utilizing the closure elements illustrated in FIG. 3.

Another embodiment of the closure system is illustrated by the sleeve 1b in FIG. 5. The sleeve 1b has edge zones 3b and 4b which are interconnected in such a manner that no projection whatsoever of the ends in the area of the parting line 9 are visible. This occurs in that the two edge zones 3b and 4b have their projections and cutouts matched to one another in such a manner than they interlock in a circumferential surface of the sleeve 1b to mutually augment one another. In other words, the projections and cutout will fit each other like a jigsaw puzzle. This is obtained by the dimension a of the length of the wide portion being the same as the length b of the enlarged cutout zone. So that the thin reinforcing elements 15 of the two edge zones 3a and 4a which reinforcing elements may consist of sheet steel are supported against one another in a good fashion during the shrinking operation, it is desirable that they are corrugated with the corrugations extending at right angles to the parting line 9 and to each of the edges of the edge zone. Here, however, the danger fundamentally exists that a closure will become unintentionally partially or entirely released before shrinkage so that the seal and the coherence are subject to question. Nonetheless, an alleviation of this or respectively a protection against this can be provided as will be explained in greater detail hereinbelow.

A cross-section of the closure system according to FIG. 5 is illustrated in FIG. 6. Here, the edge zones 3b and 4b each are provided with a coating or an additional reinforcement 14 at an inside surface of the sleeve 1b'. This reinforcement is in the form of a flexibly stiff foil or thin plate and is arranged to project from the zone such as 3b to underlie a portion of the zone 4b. Since the cutouts and the projections are interlocked jigsaw puzzle-like during assembly, the projecting additional reinforcement 14 respectively comes to lie below the opposite edge zone such as a portion of the edge zone 4b. An interlocking of the edge zones 3b and 4b is achieved and an unintentional release is prevented. By so doing, a snap-through of the closure elements is no longer possible. Since this additional reinforcement 14 lies on the inside of the sleeve 1, it is protected against corrosion at all times. The seal is created by the melting adhesive which due to the shrinkage pressure will penetrate into all joints between the closed interlocking jigsaw puzzle-like elements and after cooling seals these elements in a tight manner.

Another modification is illustrated in FIG. 7. In this modification, the sleeve 1c has an edge zone 3c which is provided with hammerhead-shaped projections having a wide portion 10' and a narrow portion or neck portion 11'. The reinforcement 14' is attached on a surface of the projection 10' and extends past an outer edge 28 thereof. The second or other edge zone is constructed in an identical way so that the cutouts and projections will mutually receive each other. The mutual interconnection will occur obliquely from the top so that the added or additional reinforcement 14' can respectively be guided below the corresponding edge and thus a closure system having a mutually engaging edge zone can be realized and lie in substantially the same plane as the cylindrical surface of the sleeve 1.

An advantage of all these embodiments of the closure sleeve with the closure device occurs in the fact that the sleeves are easy to manufacture. The reinforcements such as 15 are already introduced during the extrusion of the material into the slit sleeves and the profiles of the edge zones can be shaped by means of simple punching operations. The closure system requires no springs or clamp elements, which would have to be connected to the sleeve or collar. Furthermore, the width of the reinforcement zone 25 can be kept very small. Additional stiffening can be achieved by means of additional fluting or corrugating of the reinforcement inserts.

Although various minor modificaions may be suggested by those versed in the art, it should be understood that I wish to embody within the scope of the patent granted hereon, all such modifications are reasonably and properly come within the scope of my contribution to the art.

I claim:

1. In a longitudinally split sleeve consisting of a shrinkable material having a first and a second longitudinally extending edge zones with edges, closure means for forming a closure system with a parting line for said edge zones, said closure means consisting of mutually engaging closure elements being disposed along the parting line in the area of each edge zone and including means for reinforcing the edge zones, the improvements comprising the first edge zone having first cutout portions extending inward from the edge of the first edge zone to create a meandrous profile with outwardly extending longitudinally spaced first projections to form the elements for the first edge zone, the second edge zone having second cutout portions extending inward from the edge of the second edge zone to create a meandrous profile with outwardly extending longitudinally spaced second projections to form the elements for the second edge zones, each of the cutout portions of the first and second edge zones having a narrow portion at the edge of the edge zone and a wider portion spaced inwardly therefrom so that each of the projections have a wide portion connected by a narrower neck portion to the rest of the sleeve, said second cutout portions of the second edge zone being aligned with the first projections onthe first edge zone and being dimensioned with the widths of the wide portion of the projections and the wider portion of the cutout portion being the same and the widths of the neck portion and the narrow portion being the same so that the narrow portion of the cutout portion receives the neck portion of the projection when the closure means closes the split sleeve.

2. In a longitudinally split sleeve according to claim 1, wherein the closure elements of the two edge zones are mutually engaged with the edges of each zone pointing outward.

3. In a longitudinally split sleeve according to claim 1, wherein the closure elements of the two edge zones are mutually engaged with the edges pointing inward.

4. In a longitudinally split sleeve according to claim 1, wherein the cutout portions of each edge zone are matched to each other so that the first projections of the first edge zone are received in the second cutout portions of the second zone with substantially no projections and wherein each of the projections of one of the edge zones include an additional reinforcement on a surface extending beyond an edge of the projection to overlap an edge of the cutout portion of the other edge zone, said additional reinforcement preventing accidental disengagement between the connecting elements of the two edge zone.

5. In a longitudinally split sleeve according to claim 1, wherein the length taken in a direction at right angles to the edge of each edge zone of the wide portion of the projection is greater than the length of the wider portion of the cutout portion receiving said projection so that the projection will not pass therethrough.

6. In a longitudinally split sleeve according to claim 1, wherein the wider and narrow portions of the cutout portions are interconnected by a tapering portion and the wide portion of each projection is connected by a tapering portion to the neck portion.

7. In a longitudinally split sleeve according to claim 1, wherein the edges of the tapering portion of the projection forms an angle with the edge of said edge zone smaller than 45°.

8. In a longitudinally split sleeve according to claim 1, wherein each of the edge zones has a corrugation extending at right angles to the edge of said edge zone.

9. In a longitudinally split sleeve according to claim 1, which includes a melting adhesive provided in the edge zone so that during a heat shrinking process, the closure elements are sealed together.

10. In a longitudinally split sleeve according to claim 1, wherein the sleeve adjacent one of the two edge zones includes a laterally extending partition for covering a parting line formed by the closure system.

11. In a longitudinally split sleeve consisting of a shrinkable material having first and second longitudinally extending edge zones with edges, closure means for forming a closure system with a parting line between said edge zones, said closure means consisting of mutually engaging closure elements being disposed along the parting line in the area of each edge zone and including means for reinforcing the edge zones, the improvements comprising both the first and second edge zones having cutout portions extending inward from its edge to create a meandrous profile with outwardly extending longitudinally spaced projections to form the closure elements for each edge zone, each of the cutout portions having a narrow portion extending inward from the edge of the edge zone and a wider portion spaced inwardly therefrom so that each of the projections has a wide portion connected by a narrower neck portion to the rest of the sleeve, said cutout portions of the one edge zone being aligned with the projections on the other edge zone and being dimensioned with the width of the wider portion of the cutout portion and wide portion of the projection being the same and the width of the neck portion being the same as the width of the narrow portion so that the narrow portion receives the neck portion of the projection when the closure means closes the split sleeve.

12. In a longitudinally split sleeve according to claim 11, wherein the cutout portions of the first and second edge zones are matched to one another in such a manner that the projections of the first edge zone are received in the cutout portions of the second edge zone without any projections, and wherein one of the edge zones has an additional reinforcement disposed on a surface thereof, said additional reinforcement overlapping a portion of the projections of the other of said first and second zones to prevent accidental disengagement.

13. In a longitudinally split sleeve according to claim 11, wherein the cutout portions of each edge zone have an intermediate portion extending between the narrow portion and the wider portion with the edges of the intermediate portion extending at an angle of less than 45° to the edge of the zone so that the neck portion of each projection is connected by an intermediate portion to the wide portion of the projection.

* * * * *